UNITED STATES PATENT OFFICE.

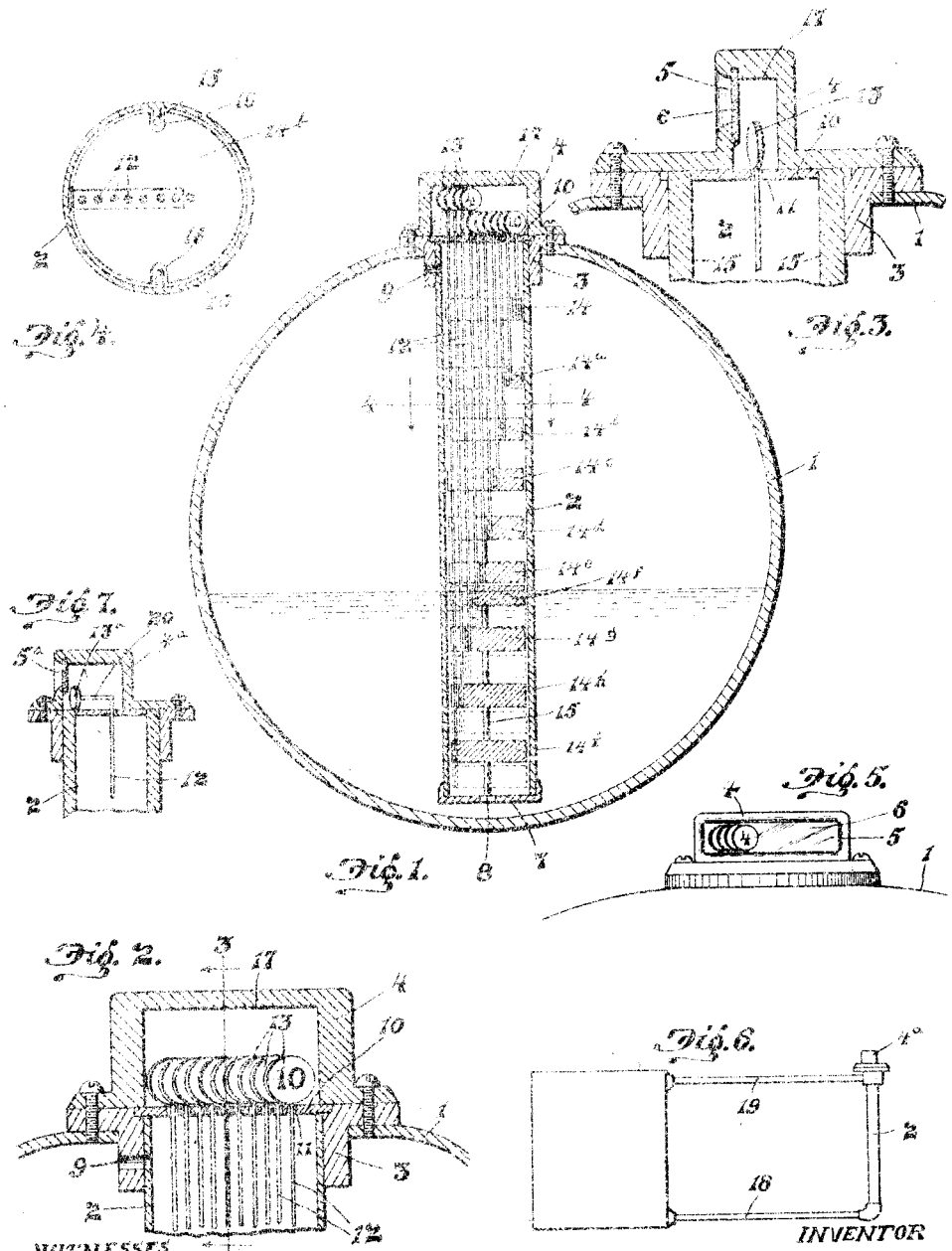

CHARLES W. CLEWELL, OF CANTON, OHIO, ASSIGNOR OF ONE-HALF TO CHARLES BROWNLOW MILLER, OF CANTON, OHIO.

LIQUID-GAGE.

1,185,985.     Specification of Letters Patent.     Patented June 6, 1916.

Application filed September 21, 1914. Serial No. 862,645.

*To all whom it may concern:*

Be it known that I, CHARLES W. CLEWELL, a citizen of the United States, residing at Canton, in the county of Stark and State of Ohio, have invented a new and useful Liquid-Gage, of which the following is a specification.

The invention relates to a gage for indicating the depth of gasolene or other liquid in a tank or other vessel, and the object of the improvement is to provide simple and efficient means for the purpose intended, which may be conveniently applied to or associated with any tank or other vessel without projecting therefrom to an objectionable extent.

The object of the invention is attained in a general way by providing a plurality of indicating tablets or disks having stems thereon depending into the tank, with floats on the lower ends of the stems at different distances from the top or bottom of the tank, with means for stopping the elevation of the indicators beyond a predetermined height; so that the liquid in the tank acting upon the several floats will elevate the same and the corresponding indicators in accordance with the varying depth of the liquid.

A preferred embodiment of the invention, thus set forth in general terms, is illustrated in the accompanying drawings, forming part hereof, in which—

Figure 1 is a cross section of a round tank showing the gage applied thereto, with certain indicators elevated to show the depth of the gasolene within the tank; Fig. 2, a fragmentary section on line 2—2 of Fig. 3 of the indicators and contiguous parts of the tank and gage as when the tank is empty; Fig. 3, a fragmentary section on line 3—3, Fig. 2; Fig. 4, a plan section on line 4—4, Fig. 1; Fig. 5, a face view of the gage cap with the indicators as shown in Fig. 1; Fig. 6, an outline view of a modified arrangement of the gage; and Fig. 7, a fragmentary section showing a modified arrangement of the indicators and the cap as shown in outline in Fig. 6.

Similar numerals refer to similar parts throughout the drawings:

The tank or vessel 1 may be of any suitable shape, and is shown in the form of a cylinder; within which tank is secured the gage tube 2 which depends from the flange 3 secured to the top of the tank, upon which flange is preferably secured the cap 4 of the gage, having the window 5 in one side thereof which may be closed by a suitable glass or other transparent panel 6.

The lower end of the gage tube 2 may be partially closed by the cap 7 having the aperture 8 therein to permit the free flow of liquid upward into the tube, but preventing an excessive washing or agitation of the same therein; and the upper end of the tube is preferably provided with a suitable vent 9 to prevent the trapping of air therein.

The upper end of the gage tube is provided with the transverse guide plate 10 having a plurality of apertures 11 therein for the stems 12 of the indicators 13; which plate not only serves as a guide for the stems but as a support or rest for the indicators when the tank is empty. The stems 12 of the indicators may be made of wire or any suitable light material and each one extends downward a different distance into the gage tube; and to the lower end of each stem is secured a float 14 or 14ᵃ to 14¹, which, as shown, are each in the form of a disk, and may be made of cork or other buoyant material, and as shown these floats are preferably arranged one directly above another in an upright column.

Two or more vertical ribs 15 are preferably provided in the sides of the tube, and engaging notches 16 are provided in the corresponding edges of the several floats, by means of which the same are guided upward and downward in the gage tube and prevented from turning therein; and each float is provided with a suitable slot or other form of opening for freely receiving and passing the longer stems of the indicators which extend below the particular float.

The parts are so proportioned and arranged that when the tank is empty the floats will be suspended by the stems from the several indicators, which in turn are normally supported or rest in a row upon the guide plate 10 at the top of the tube, as shown in Fig. 2; in which position the indicators are preferably below the window in the cap of the gage, as shown in Fig. 3, so that they cannot be viewed through the same.

When, however, gasolene or other liquid is present in the tank the same finds its level within the tube through the aperture 8 at its lower end, and elevates the several floats as shown for four floats in Fig. 1, thereby elevating the corresponding indicators until they are stopped by the top 17 of the cap, in which position they may be clearly seen through the window 5 and show the amount of gasolene in the tank.

The indicator tablets or disks are preferably arranged in echelon so that, as viewed through the window, the first ones raised will be hidden by the last ones raised, and the face only of the last one raised will be seen, thereby indicating the particular number of units of liquid which are contained in the tank at any given time. The indicators may be numbered from 1 to 10 as shown, or in any other suitable manner to designate the units of capacity of the tank.

It is evident that the gage tube need not be located within the tank, but may be placed adjacent thereto with a communicating tube 18 extending from the bottom of the tank to the bottom of the tube, and when there is pressure in the tank, an equalizing tube 19 is provided between the top of the tank and the upper end of the tube. And in the modified arrangement of the cap 4ª, shown in Fig. 7, the same may be extended laterally so that the window 5ª therein will be located at or beyond one side of the tube 2; in which arrangement of the parts the indicators 13ª may be mounted on the ends of an L-extension 20 on the upper end of the stems 12.

The tube is not an essential feature of the gage, but the use of the same is preferred as a convenient means for holding and guiding the floats in upright column and protecting the same against the oscillation of the gasolene in the tank. And finally, the cap is not an essential feature, but its use is preferred as a stop for limiting the upward movement of the indicators and also for protecting the same.

I claim:

1. A liquid gage including a plurality of indicators having differential stems with floats thereon, the indicators being normally arranged in a row.

2. A liquid gage including a plurality of indicators having differential stems with floats thereon, the indicators being arranged in echelon.

3. A liquid gage including a plurality of indicators having differential stems with floats thereon, the indicators being arranged in echelon, and having capacity designations thereon.

4. A liquid gage including a plurality of indicators having differential stems with floats thereon, guiding means for the floats, there being openings in the floats connected to the shorter stems for freely passing the longer stems.

5. A liquid gage including a plurality of indicators normally arranged in a row, a plurality of normally spaced floats arranged in upright column, and differential stems connecting corresponding indicators and floats.

6. A liquid gage including a plurality of indicators having differential stems with normally spaced floats thereon, a tubular guide for the floats communicating with the liquid arranged in upright column at its lower end and having an equalizing vent at its upper end.

7. A liquid gage including a plurality of indicators having differential stems with floats thereon, supporting means for the indicators when the floats are above the liquid, and means for stopping the indicators when the floats are buoyed upward by the liquid.

8. A liquid gage including a plurality of indicators having differential stems with floats thereon, a supporting plate for the indicators having apertures for the stems, and a cap over the indicators with a window on one side, the cap forming a stop for the indicators when opposite the window.

9. A liquid gage including a plurality of indicators having differential stems with floats thereon, supporting means for the indicators, a cap having a window in one side above the indicators when resting on the support, and means for stopping the indicators opposite the window when buoyed upward by the floats.

10. A liquid gage including a plurality of indicators normally arranged in a row, a plurality of floats, and means for connecting the several indicators with the floats whereby the latter are normally at different levels and will be operated by the varying level of the liquid for moving the indicators from their normal arrangement.

CHARLES W. CLEWELL.

Witnesses:
LOUISE M. CORBY,
EARL C. CARLSON.